Jan. 25, 1966  M. S. JOHNSTON  3,231,154
SIPHON DEVICE FOR BEER KEGS AND THE LIKE
Original Filed Nov. 8, 1961  3 Sheets-Sheet 1
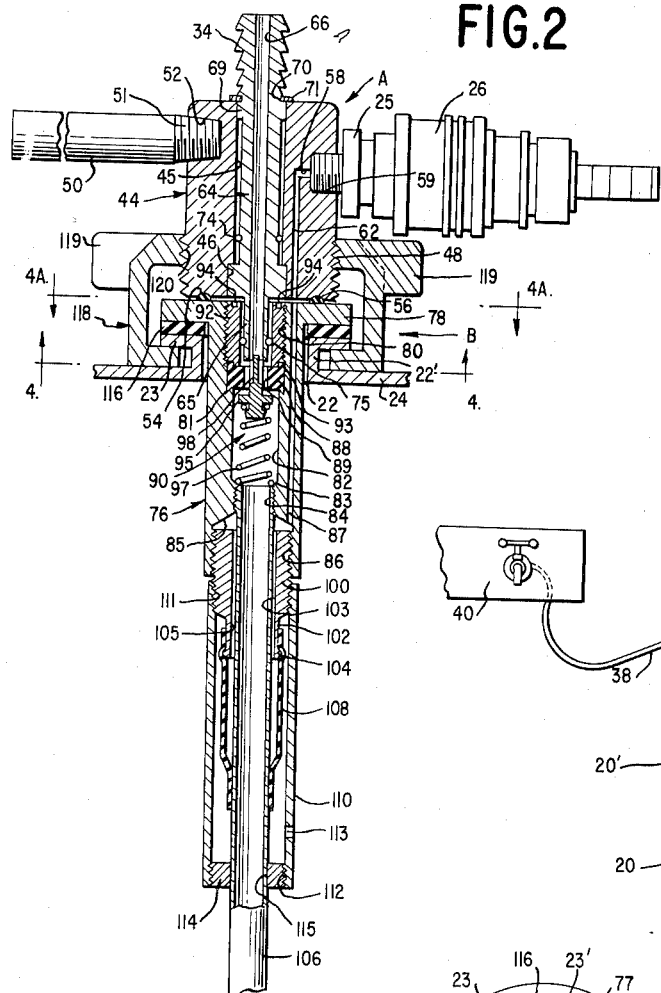
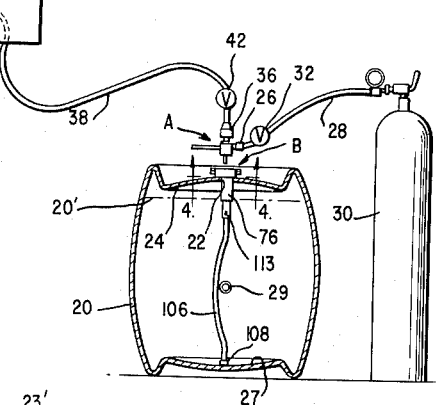
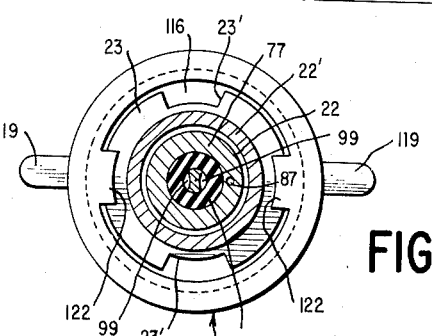
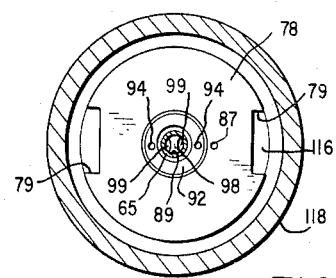
INVENTOR
MACK S. JOHNSTON
BY *LeBlanc & Shur*
ATTORNEY Jan. 25, 1966     M. S. JOHNSTON     3,231,154
SIPHON DEVICE FOR BEER KEGS AND THE LIKE
Original Filed Nov. 8, 1961     3 Sheets-Sheet 2
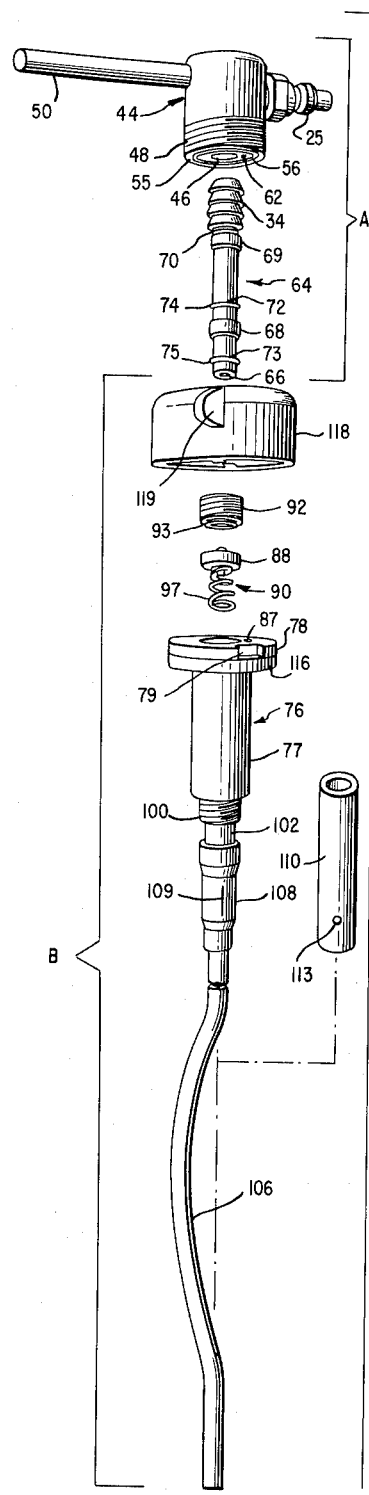
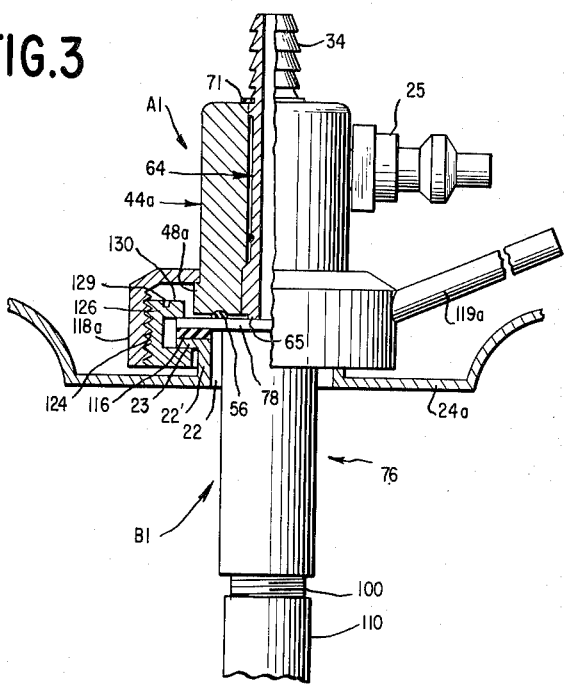
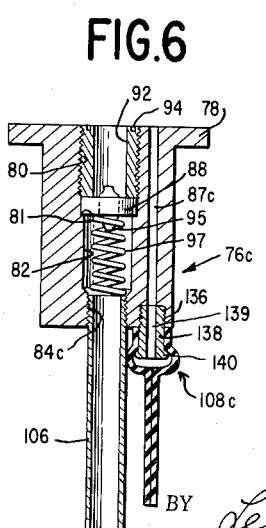
INVENTOR
MACK S. JOHNSTON
BY LeBlanc & Shur
ATTORNEY Jan. 25, 1966  M. S. JOHNSTON  3,231,154
SIPHON DEVICE FOR BEER KEGS AND THE LIKE
Original Filed Nov. 8, 1961  3 Sheets-Sheet 3
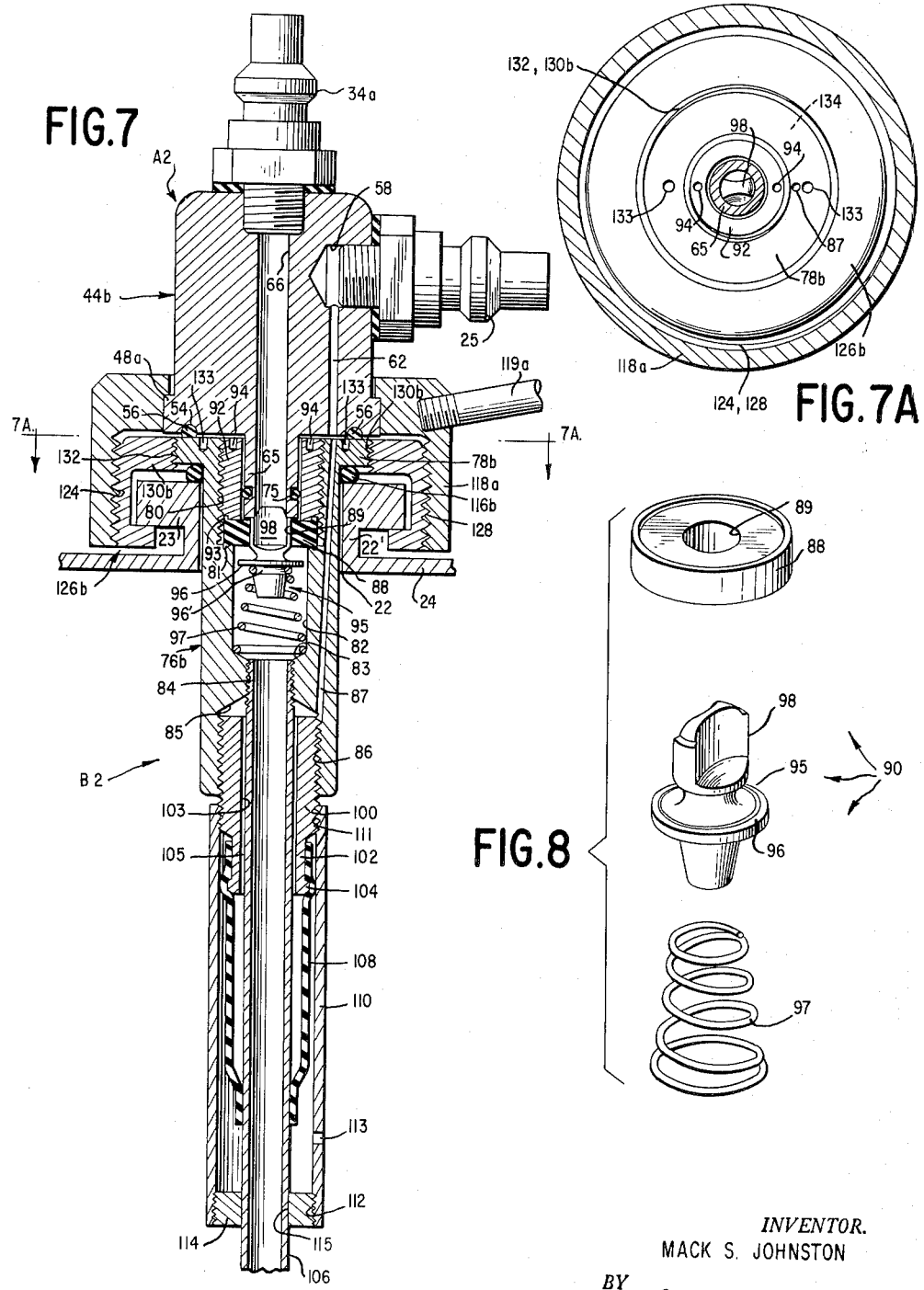
INVENTOR.
MACK S. JOHNSTON
BY
*LeBlanc & Shur*
ATTORNEY

United States Patent Office 3,231,154
Patented Jan. 25, 1966

3,231,154
SIPHON DEVICE FOR BEER KEGS AND THE LIKE
Mack S. Johnston, % Avalon Plastics, Inc.,
127 N. Avalon Blvd., Wilmington, Calif.
Continuation of application Ser. No. 150,982, Nov. 8, 1961. This application Sept. 8, 1964, Ser. No. 395,084
15 Claims. (Cl. 222—400.7)

This application is a continuation of my copending Serial No. 150,982, filed November 8, 1961 and now abandoned.

The present invention relates to a new improved gas pressure siphon device for drawing fluid such as beer from containers such as beer kegs or barrels, using a gas to drive the fluid from the container. More especially, the present invention relates to a new improved siphon device comprising a portion which remains in the keg at all times, whereby the keg is contantly sealed, and another portion which is permanently connected to a dispenser (as in a restaurant) and can be readily connected to the keg portion by a bar tender so that the dispensing siphon is automatically in operating condition.

Three of the principal problems encountered in the brewery industry, and establishments selling draft beer, are: (1) keeping the beer kegs and related dispensing equipment clean and sanitary; (2) preventing contamination of the draft beer, which will destroy its brewery-fresh flavor; and (3) keeping the beer "lively," especially toward the end of the tapping of a keg.

The prevailing practice of the beer industry is for the brewery to provide draft beer to dispensers like restaurants in kegs which have an opening at the top closed with a bung in the form of a cork or plug. To dispense the beer from the keg, the bar tender "taps" the keg by knocking in or pushing in the bung and inserting an elongated tap rod with an associated siphon device for drawing the beer from the keg, these being fastened to the keg by means of a "bayonet" nut or like connection. The mentioned siphon device includes means for injecting compressed air into the keg to drive the beer up through the siphon, and also valve means for respectively controlling the flow of beer from the keg and gas into the keg. As gas supply hose connects the siphon to a source of gas, and a beer dispensing hose connected to a dispenser (e.g., on a bar) is attached by the bar tender to the siphon; and beer is then dispensed from the keg. When the beer has been withdrawn to the extent feasible, the bar tender then removes the tap and siphon device from the keg, removes the keg from the dispenser cabinet, installs a new keg, and repeats the process of knocking in or pushing in the bung and installing the tap rod and related siphon equipment, etc. The same tap rod and siphon is used for every keg, and must be washed and cleaned periodically to prevent fouling and contamination.

This current practice has a number of disadvantages for the brewery, the dispensing establishment, and the public.

For one thing, the opened kegs become filled with debris and trash of every sort. Often mice or other objectionable things get into the keg and swell and become difficult to remove through the bung hole. Such occurrences are a substantial problem to everyone concerned.

Further, old yeast and other solids from the beer inevitably accumulate in the currently used conventional tap and siphon arrangements, with resultant accumulation of destructive bacteria feeding on this material. When a new keg is tapped and the gas pressure is applied, the beer will surge into unclean portions of the tap and siphon devices currently conventionally employed. This causes the accumulated residue of yeast, bacteria, etc., to be washed down into the keg, thus promptly contaminating the carefully brewed product and also destroying its "brewery-fresh" flavor. Also, during the course of dispensing the beer from the keg with conventional tap and siphon means, there is a tendency of the beer to surge back and forth into the tap chamber where the old yeast and destructive bacteria have accumulated as varying gas pressure is applied, as the dispenser is operated. Hence, when a keg is tapped with conventional methods, the great care in preparing pure good quality beer at the brewery promptly goes to naught at the dispensing establishment.

Another problem with current conventional keg tap and siphon arrangements is that when the bar tender removes the tap rod and siphon arrangement from an empty keg, residual gas pressure in the keg will often cause the tap and siphon unit to pop out suddenly, sometimes injuring the bar tender.

Still another problem of current conventional keg tapping and siphon units is that the beer keg is generally kept in a refrigerated unit under the bar, with limited space, as a result of which tapping of the keg by the bar tender is a somewhat awkward, difficult, and time-consuming process.

These and other problems and shortcomings of conventional beer keg tapping and siphon arrangements have long been recognized, and many devices have been developed in attempts to solve them. However, such devices have had serious practical and/or economic shortcomings, whereby the above-described tap and siphon arrangement is still in common use.

It is a principal object of the present invention to provide a new improved siphon arrangement for packaging and dispensing of beer or like liquids in kegs or barrels which overcomes the above-discussed and other problems and shortcomings of beer dispensing systems heretofore available, and also provides a number of important advantages and improved results as hereinafter amplified.

It is a principal object of the present invention to provide a new improved means for packaging and dispensing beer and like liquids in kegs which comprises (1) a siphon adapter subassembly that is installed in the keg by the brewery and seals the keg, and (2) a new improved coupler sub-assembly which is merely fastened to said siphon adapter in the keg by the tavern keeper, thus automatically breaking the seal and readying the keg for dispensing of beer. It is a related object of this invention to provide such a new improved means for packaging beer in kegs or barrels, and dispensing therefrom, which eliminates the need of the bar tender to remove a bung and insert or remove a long tap rod in the keg, and obviates cleaning of such tap rods and related siphon devices. It is another related object of this invention to provide a siphon device whereby simple removal of the aforementioned coupler sub-assembly by the bar tender will cause the keg to automatically re-seal, thereby positively preventing the entry of foreign objects.

It is still another object of the present invention to provide a new improved beer dispensing siphon device which includes means positively preventing the beer from entering the gas feeding portion of the siphon, thus preventing contamination or fouling of this portion of the siphon by dried beer residue which normally would accumulate due to surging of the beer. It is a related object of this invention to provide a new siphon with improved valve means which allow the gas to be fed into the beer keg but prevent the beer from feeding back into the gas supply portion of the siphon.

It is still another object of the present invention to provide such a new improved dispensing unit which is easy to keep clean and sanitary, and which inherently minimizes the problem of contamination.

It is another object of the present invention is to provide a new improved siphon and tap unit for dispensing beer from kegs which is arranged so as to introduce gas into the beer during a substantial portion of the beer removal process, thereby causing the beer toward the bottom of the keg to stay "lively." It is another related object of this invention to provide such a new improved system which prevents beer from going stale at the end of the keg, whereas users of conventional tap and siphon systems heretofore available generally experience loss of about the last gallon of beer in a keg due to the fact that it has gone stale and flat. It is still another related object of the present invention to provide a new improved system for dispensing of beer which results in a minimal loss of beer when the keg is tapped (for example, one glass), whereas users of conventional systems experience substantial loss of beer when the keg is taped (e.g., one gallon).

It is still another object of the present invention to provide a new improved beer keg incorporating the aforementioned siphon tapping adapter of the present invention. It is another related object of the present invention to provide such a new improved beer keg with the aforesaid new adapter which includes a tap rod that is curved so as to permit the brewery to readily insert a rod for filling the keg through a side hole, in accordance with existing practices, without interference from the siphon adapter sub-assembly tap rod within the keg.

It is still another object of the present invention to provide such a new improved siphon device for packaging and dispensing of liquids which can be used with any standard type of beer keg currently in conventional usage.

It is still another object of the present invention to provide such a new improved means for packaging and dispensing of beer or like liquids from keg or like container which achieves the above-discussed objects and advantages, yet can be made at relatively low price with conventional machinery and a minimum of tooling, whereby widespread use of the invention in its intended field is economically feasible.

Still other objects and advantages of the present invention will be apparent from the following description thereof with reference to the accompanying drawings, and also the appended claims. In the drawings:

FIGURE 1 is a schematic view showing the new packaging and dispensing siphon device of the present invention as it would be installed in a beer keg associated with a beer dispenser, and a source of gas under pressure, (the beer keg being broken away and shown in section for clarity);

FIGURE 2 is a vertical sectional view of one embodiment of the new improved packaging and dispensing siphon device of the present invention, showing in assembled relation the adapter unit which is installed in the keg and the coupler unit of the beer dispenser which is applied by the bar tender;

FIGURE 3 is an exploded perspective view showing principal components of the packaging and dispensing siphon device shown in FIGURE 2, it being noted that the portion of FIGURE 3 within bracket A constitutes the coupler unit applied by the bar tender and that the portion within bracket B constitutes the adapter unit which is installed in the keg at the brewery;

FIGURE 4 is a sectional view taken along line 4—4 in FIGURES 1 and 2;

FIGURE 4A is a sectional view taken along line 4A—4A in FIGURE 2;

FIGURE 5 is a side elevation and partial sectional view of another embodiment of a packaging and siphon device according to the present invention, somewhat modified from the embodiment shown in FIGURES 1–4A;

FIGURE 5A is a perspective (and inverted) view showing one of the components of the modified embodiment shown in FIGURE 5;

FIGURE 6 is a vertical cross-sectional view of a modified valve component of the adapter sub-assembly usable in another variation of the siphon device shown in FIGURES 1–4A or 5;

FIGURE 6A is a side elevation (in reduced size) of the siphon adapter sub-assembly valve component shown in FIGURE 6, looking to the left in FIGURE 6;

FIGURE 7 is a vertical sectional view of a preferred embodiment of the new improved dispensing device of the present invention, showing the keg adapter unit and dispenser coupler unit in assembled relation;

FIGURE 7A is a sectional view of the siphon device of FIGURE 7, taken along line 7A—7A in FIGURE 7; and FIGURE 8 is an enlarged perspective view of he spring loaded valve used in the keg adapter unit of the embodiments shown in FIGURES 1–4A and FIGURES 7–7A.

Referring especially now to FIGURE 1, there is schematically shown a conventional beer keg 20 having an opening 22 in its top end wall 24, in which opening there is received the siphon keg adapter unit B of the present invention, this unit being semi-permanently installed in the keg 20. The dispenser coupler unit A is the present invention can be readily connected with the adapter unit B to form a tapping siphon assembly as hereinafter amplified. The siphon dispenser coupler unit A has a gas inlet port and fitting (25 in FIGURES 2, 3, 5 and 7) adapted to receive a coupler 26 at the end of a gas supply tube 28 which communicates with a gas supply tank 30. If desired, a valve 32 of suitable conventional type may be supplied for the coupler 26, so that the flow of gas may be controlled at the location of the keg 20. The dispenser coupler unit A also has a beer exit fitting 34 (FIGURES 2, 3 and 5, or 34a in FIGURE 7) which is adapted to receive a suitable conventional coupler 36 at the end of flexible tube 38, through which the beer is conducted to a conventional dispenser 40. If desired, a suitable valve 42 may be associated with the coupler 36, in conventional manner, for control of the beer flow at the keg 20. The arrangement of FIGURE 1 is shown merely for the purpose of illustrating usage of the present invention. Since the components thereof, other than the siphon units A and B, are conventional, and do not comprise a part of the present invention, further description thereof is believed unnecessary, as dispensing arrangements for use with the new improved siphon device of this invention will be apparent to those skilled in the art in light of the disclosure herein.

Referring particularly to FIGURES 2–4A, the new improved siphon device of this invention comprises two main units A and B herein generally called the "dispenser siphon coupler" and "siphon keg adapter," respectively. Siphon dispenser coupler unit A comprises a main cylindrical head portion 44 which is provided with an internal bore of two diameters indicated at 45 and 46; and part of the lower exterior surface of head portion 44 is threaded at 48 for fastening to the siphon keg adapter unit B, as below explained. A steel handle 50, which is threaded at one end at 51 is screwed into a threaded aperture 52 in the side of head 44, near the top of said head. The underside of head 44 is provided with an annular groove 54, in which there is suitably secured a sealing ring or gasket 56 (by press-fit and/or adhesive). This sealing ring 56 may be made of neoprene rubber or other suitable material, and it normally extends outwardly from the lower surface 55 of head 44, whereby the ring 56 will form a seal around the components inside ring 56 when the siphon dispenser coupler unit A is assembled with the siphon keg adapter unit B, as is particularly apparent from FIGURE 2.

(In a typical unit, the head 44 would be about 1½ inches high and 1¼ inches in diameter, and the sealing ring 56 would extend from the underside 55 approximately ⅟₁₆ of an inch. Other components of siphon units A and B would be sized with relative proportions substantially as shown in FIGURES 2 and 7, in a manner which will be apparent to those skilled in the art in light of the disclosure herein.)

Holes 58 and 59 are drilled transversely into the upper portion of coupler head 44, the larger hole 59 is threaded to receive a threaded portion of coupler 25, which in turn is connected to previously mentioned coupler 26 of the air supply conduit 28. (A typical suitable coupling 25, 26 is the "Flomatic coupler" made and sold by the Superior Products of Minneapolis, Minnesota.) Another small hole 62 is drilled in coupler head 44 from its bottom side, vertically, inside of sealing ring 56, and in communication with the transversely extending small hole 58. This provides a gas or air passageway whereby gas from the cylinder 30 fed through tubing 28 is caused to enter head 44 through coupler 25–26 and pass down through head 44 via conduit 58, 62, to drive the beer from the keg, as below amplified.

The siphon coupler head 44 also includes a "probe" 64 which is generally tubular and has a central bore 66 extending throughout its length. The probe 64 has an enlarged cylindrical section 68 which is adapted to seat within the enlarged bore 46 in head 44, and may also have another enlarged section 69 adapted to seat within the smaller bore 45 in head 44 (as is particularly apparent from FIGURES 2 and 3). The exterior of the probe 64 is provided with an annular groove 70 adapted to receive a conventional retaining ring 71 for securing the probe within the siphon coupler head 44, after it is inserted through the center bore of the head 44 from the bottom thereof. The exterior of the probe 64 is also provided with grooves 72 and 73 for seating sealing rings 74 and 75, which may be O-rings of neoprene rubber. As is especially apparent from FIGURE 2, the sealing ring 74 provides a seal against passage of liquid or gas between the exterior of probe 64 and the interior of central aperture 45, 46 of the head 44; and the O-ring 75 also provides a similar seal between the probe and the related component of the adapter unit B for functional purposes hereinafter amplified. The top of the probe 64 is provided with grooves 34 of suitable shape and size for attachment thereto of the conventional coupler unit 36 at the end of tubing 38 extending from beer dispenser 40.

(It is noted that, with a head 44 approximately 1½ inches high and 1¼ inches in diameter, probe 64 is approximately 2¾ inches in length, with approximately ¾ of an inch of the probe projecting above the head for coupling purposes, and approximately ⅜ of an inch projecting below the head, with the underside of probe shoulder 68 being substantially flush with the under surface 55 of head 44. It is noted also that the lower end 65 of the probe is of reduced diameter for suitable cooperation with the siphon keg adapter B as hereinafter described.)

Still referring to FIGURES 1–4A, the siphon keg adapter B will now be particularly described. The adapter unit B comprises a main fitting generally indicated at 76, which has a cylindrical section 77 with an enlarged flange 78 extending outwardly from the upper end thereof. The entire center of fitting 76 is drilled out to provide four aligned bores 80, 82, 84 and 86, of different diameters. Chamfered portions 83 and 85 interconnect bore 84 with bores 82 and 86, respectively, and a shoulder 81 is provided between bores 80 and 82. Bores 80, 84 and 86 are threaded, as shown particularly in FIGURE 2, for reasons amplified hereinafter; it is noted, however, that bore 80 need not be threaded for its entire length since the bottom of this bore accommodates a rubber or like seating ring or washer 88 which forms a part of a spring-loaded valve sub-assembly 90 received within bore 82. (See especially FIGURES 2, 3 and 8.) The threaded portion of upper bore 80 receives an annular valve retainer ring 92, which is provided on its top surface with a pair of aligned indentations 94, whereby a spanner wrench can be used to screw ring 92 into threaded bore 80 so that the bottom of ring 92 tightly engages the top of the rubber valve seat 88. It will be noted that the shoulder 81 which supports the lower edge of valve seat 88 is preferably cut at an angle as shown in FIGURE 2 (and FIGURE 7), and that the lower edge of the retaining ring 92 is preferably provided with a peripheral shoulder recess 93, whereby the rubber ring 88 is held in place with a better seal.

Referring to FIGURES 2–4A and 8, the valve 90 comprises a closure member 95 which has a plate-like section 96 adapted to engage the underside of ring 88 and thus close off its central aperture 89, with a groove 96' below plate section 96 for securing member 95 to the top coil of compression spring 97. The lower end of spring 97 rests against the chamfered portion 83 at the bottom of bore 82. The valve closure member 95 has a stem portion 98 extending upwardly from its central sealing plate section 96, and this stem portion 98 has a cross-section as shown particularly in FIGURES 4, 4A and 8, whereby fluid may pass through the resultant spaces 99 between valve stem portion 98 and the inside walls of aperture 89 in valve seating ring 88. Thus, when the closure plate 96 of valve member 95 abuts the underside of the sealing ring 88 due to the action of compression spring 97, as is normally the case when the siphon dispenser coupler unit A is not assembled on the siphon keg adapter unit B, the described valve 90, 88 will prevent passage of fluid or the like from or into chamber 82. On the other hand, when the valve stem portion 98 is depressed (as by probe extension 65 of the head 44 when units A and B are assembled) fluid may flow from chamber 82 through the openings 99 in the valve seating ring 88, as amplified hereinafter in description of the operation of the complete siphon assembly.

There is received in the threaded aperture 86 at the lower end of fitting 76 a ferrule having an upper enlarged threaded section 100 and a smaller unthreaded cylindrical section 102, at the lower end of which is an annular lip 104. The threaded aperture 84 receives the threaded upper end of an elongated tube 106 known as a "restrictor rod" or "tap rod." Referring back to FIGURE 1, this tap rod 106 is of sufficient length so as to substantially reach the bottom 27 of beer keg 20 for the purpose of siphoning beer from the keg. Beer tap rod 106 can be straight, but is preferably provided with a slight curve in the middle as shown in FIGURE 1, so as to permit non-interfering insertion of an elongated nozzle or hollow rod into hole 29 in the side of keg 20 for the purpose of filling the keg with beer, in accordance with current conventional brewery practice. The lower end of the tube 106 may be provided with any suitable strainer, as schematically shown at 108 in FIGURE 1 (e.g., as disclosed in my co-pending application Serial No. 25,592 filed April 29, 1960, now abandoned, particularly in FIGURE 4 thereof).

The siphon keg adapter B includes a cylindrical gum rubber valve 108 (such as fully disclosed in my aforementioned co-pending application Serial No. 25,592), as shown especially in FIGURES 2 and 3. Cylindrical rubber valve 108 has its reduced upper end fitted tightly in sealing relation over lip 104 of ferrule section 102, and has its lower end fitted tightly in sealing relation around the outside of restrictor or tap rod 106. The enlarged intermediate section of rubber valve 108 is provided with one or more longitudinal slits 109 to permit compressed gas or air to pass from the inside of the valve to its outside, while preventing beer (or other fluid) in keg 20 from passing to the inside of rubber valve 108.

A hollow member 110, which has its upper end internally threaded at 111, is mounted on the upper threaded ferrule portion 100. Tube 110 is also internally threaded at its lower end 112 to receive a small annular bushing 114 which has a central aperture 115 surrounding the exterior of restrictor rod 106 with a close, but not tight, fit. Tubular member 110 is also provided with at least one aperture 113 (FIGURE 3), whereby gas passing from the inside of rubber valve 108 through valve slit 109 may exit from aperture 113 into the keg 20. The main purpose of tube 110 is to cover and protect the rubber valve 108. (Since the nature and operation of rubber valve 108 is fully explained in my aforementioned co-pending application Serial No. 25,592, further detailed description thereof is deemed unnecessary.)

It will be noted that ferrule 100, 102 is provided with an axially extending inside bore 103 which is of larger diameter than the outside diameter of tap rod 106, whereby there is a gas passageway 105 between ferrule 100, 102 and the tap tube 106.

The main fitting 76 of adapter B is also provide with an air passage 87 extending vertically from the top of fitting member 76 to the chamber formed within the upper end of bore 86, as is especially apparent from FIGURES 2 and 4A (and FIGURE 7).

The flange 78 of main fitting member 76 is provided with a pair of opposed peripheral notches 79, and there is disposed below the flange 78 an annular washer 116, as shown especially in FIGURES 2-4A. The assembled siphon keg adapter unit B also includes a generally annular mounting collar 118 having a configuration as shown especially in FIGURES 2-4A, with a pair of external lugs 119 whereby collar 118 may be readily turned for installation or removal of the adapter unit B from beer keg 20. As will be apparent from FIGURE 2, the collar 118 has an upper threaded aperture 120 for receiving the threaded section 48 at the bottom of head 44 of siphon dispenser coupler A. The lower portion of collar 118 has a pair of inwardly extending lips 122 adapted to form a part of a bayonet connection with the flange 23 which extends laterally from the short cylindrical wall 22′ of beer keg opening 22 and is provided with recesses 23′ to permit passage of collar lips 122. Notches 79 in flange 78 of keg adapter part 76 permit assembly of collar 118 on part 76, and annular washer 116 normally retains these parts together.

It will be apparent that the keg adapter unit B can be readily assembled in the opening 22 of a beer keg 20 by passing the lips of the ring 118 through the keg flange recesses 23′ and turning the ring 118 a quarter turn, and that the washer 116 (properly sized) will provide a sealing connection between keg 20 and adapter B, and a compression force that prevents accidental removal of ring 118 and adapter B. When the siphon keg adapter B is thus assembled in the opening of keg 20, gas and/or fluid are prevented from escaping from, or entering, keg 20. If desired, the bayonet arrangement for securing the siphon adapter unit B to the keg 20 can be suitably modified. For example, stops may be provided on the underside of keg flange 23 to prevent excessive turning of adapter collar 118 during installation; or the underside of flange 23 and/or the inside surfaces of lips 122 of collar 118 may be provided with sloping surfaces to provide a wedging effect for retaining the adapter unit B in keg 20 with greater force, to minimize the accidental removal. Such modifications will be apparent to those skilled in the art in light of the disclosure herein, whereby further discussion thereof is believed unnecessary.

Operation of the above-described new improved siphon of the present invention will now be summarized:

The siphon keg adapter B is installed in keg 20 by inserting the main fitting 76 and tap rod 106 extending therefrom through the aperture 22 of keg 20, and then securing this adapter unit B to keg 20 by connecting adapter collar 118 to beer keg flange 23 as above described. Keg adapter B can be washed and sterilized in place in the keg, while the latter is being sterilizer, by using a "gun" similar to adapter A to shoot cleaning solution and then hot water or steam through unit B. (Periodically unit B would be removed for sterilization.) The keg 20 is filled with beer by means of a filling rod inserted through the side aperture 29 past the curved section of the restrictor tube 106, and the beer would generally be filled to a level 20′ above the gas inlet aperture 113 of the keg adapter unit B, for reasons amplified below. Unless and until the siphon coupler unit A is installed, the pressure of the spring 97 on the underside of the valve closure member 95 forces plate 96 to engage the rubber seating ring 88, thus sealing keg opening 22 to prevent either gas or beer from escaping.

When the keg 20 incorporating the siphon keg adapter B is installed in the beer dispensary, the bar tender assembles the siphon coupler unit A in the keg adapter unit B by the simple expedient of screwing the base 48 of coupler 44 into the threaded aperture 120 of keg adapter mounting collar 118, until the O-ring 56 is sufficiently compressed into good sealing engagement with the top surface of flange 78 of the main fitting 76 of adapter B. At the same time, this causes tip 65 of coupler unit probe 64 to be inserted within the axial bore of seating ring 92 (with O-ring 75 in sealing engagement therewith) to such extent that the lower end of probe tip 65 depresses the vertical stem portion 98 of the valve closing member 95, thereby displacing the sealing ring 96 of valve member 95 from the underside of rubber seating gasket or ring 88, as shown in FIGURE 2 (and FIGURE 7). This allows beer entering spring valve chamber 82 via tap rod 106 from keg 20 to pass through aperture 89 of valve seating ring 88 into the central bore 66 of the coupler unit probe 64 and thence through the dispensing hose 38 to the dispenser 40. Since the O-ring 75 is in sealing engagement with the inside of retainer ring 92, beer is prevented from escaping to the outside of coupler probe 64.

The faucet at dispenser 40, and the valve 42 in dispensing line 38 (if included) are used to suitably control withdrawal of beer from the keg 20. When the keg 20 is first tapped, the natural pressure of gas within the keg will drive beer up through tap rod 106 through siphon assembly A-B. The described siphon A-B of the present invention provides such an effective means for initial tapping of the beer keg that the loss of draft beer upon tapping is automatically kept to a minimum (for example, one glass); whereas typical loss upon tapping of a keg with described conventional means presently used may run in the order of a gallon, due to excess pressure of $CO_2$ which has escaped from the beer.

The air supply fitting 26 is secured to coupler 25 of siphon unit A, and compressed air or gas is supplied at a controlled rate to the siphon A-B. Since the lower surface of head 44 of coupler unit A is sealed tightly against the upper surface of flange 78 of adapter unit B, and since the probe 64 is also sealed with respect to the adapter unit B by O-ring 75, the gas or air fed into aperture 58 is forced down through passage 62 into the small hole 87 and thence into the upper portion of bore 86 just above the ferrule 100. (It will be noted that, due to the described arrangement of sealing rings 56 and 75 (and O-ring 74 in the FIGURE 2 embodiment), it is not essential for said hole 87 in adapter sub-component 76 to be in line with hole 62 in head 44 of coupler unit A; and that such alignment is shown merely for convenience of illustration in the drawings.) The compressed gas or air passing into the upper end of bore 86 cannot pass back upward into the valve chamber 82, through which beer is passed via tap rod 106, because the tap rod 106 is tightly screwed into threaded aperture 84 of adapter sub-component 76, thus providing a complete seal at this point. Because there is a spacing 105 between ferrule 100, 102 and tap rod 106, the gas or air is in turn forced down through passageway 105 into the center belly of rubber valve 108. When the pressure in the keg 20 is less than the gas pressure fed to siphon A-B, the rubber valve 108 expands, thereby releasing gas into the keg through the valve slit(s) 109 and vent(s) 113 in covering sleeve 110. The pressure of the gas thus injected into the keg 20 forces the beer through strainer 108 into the lower end of the tap rod 106, and up through tubular rod 106 directly into the spring valve chamber 82, whence it passes through openings 99 within ring 88 into central aperture 66 of coupler unit A to the dispensing line 38, as previously discussed.

It will be noted that, in the preferred usage of this invention, the rubber valve 108 and aperture 113 in its protecting sleeve 110 are disposed below the initial beer level indicated at 20' in FIGURE 1, whereby the compressed gas or air from tank 30 is injected directly into the beer, instead of above the beer, in the initial stages of beer withdrawal. The reason for this is that during storage some of the $CO_2$ in the beer within the keg escapes from the beer into the small gas layer in the keg, which of course overlies the beer when keg 20 is vertically disposed. Thus, at the time of tapping, a keg of beer usually has three layers of beer with varying amounts of $CO_2$: the upper layer has less $CO_2$ than it should, and therefore tends to go "stale," especially when the last of the keg is being withdrawn; the bottom layer has more $CO_2$ than necessary and tends to foam unduly, especially in the early stage of tapping; and the middle layer of beer has about the right amount of $CO_2$. When the compresed air or gas fed to siphon A–B to displace beer from the keg is injected below the initial beer level, a certain portion of the gas is absorbed in the upper beer layer, thus freshening this portion of the beer and thereby minimizing or eliminating the amount of beer which goes stale at the end of the keg withdrawal. (As previously noted, however, the control over the opening of beer dispensing valve 90 by means of the quick insertion of coupler unit A minimizes undue initial loss of beer and foaming when the lower keg layer having excess $CO_2$ is withdrawn during initial tapping of the keg, as previously noted.)

It is noted that the opening 120 of the adapter unit B would normally be covered at the brewery with a suitable means, such as a plastic cover or plug which could be screwed or snapped into or over opening 120, thus protecting the valve and other parts of adapter unit B from ingress of dirt or the like. Preferably, this cover would have a spring loaded cover plate over opening 120 which is moved out of the way when the bar tender taps the keg and then automatically again covers opening 120 when coupler unit A is removed after the keg is emptied so dirt will not get in during subsequent storage.

Referring now to FIGURES 5 and 5A, there is shown therein another siphon embodiment of this invention which is a modification of the above-described embodiment of FIGURES 1–4A. For clarity, and to minimize duplicate description, parts of the embodiments of FIGURES 5 and 5A which are the same as corresponding parts in the embodiment of FIGURES 1–4A are identified by like numerals as in FIGURES 1–4A; and modified parts of the embodiment of FIGURES 5–5A corresponding to parts of FIGURES 1–4A are identified with like numerals as in FIGURES 1–4A plus the letter $a$, to the extent feasible.

In the embodiment of FIGURES 5–5A, the dispensing siphon assembly comprises a keg adapter unit $B_1$ and a dispenser unit $A_1$ which are similar to the keg adapter and coupler units B and A, respectively, of FIGURES 1–4A, the principal difference being that the siphon embodiment of FIGURES 5–5A is somewhat modified for use with a conventional keg having a sunken top, which is indicated at 24a.

Head member 44a of dispenser coupler unit $A_1$ in FIGURE 5 is the same as head unit 44 in the dispenser coupler unit A of FIGURES 1–4A, excepting for omission of the threaded section 48 of the coupler head 44 in FIGURES 1–4A, and the provision of an enlarged annular shoulder-forming ring 48a at the lower end of coupler head 44a in the FIGURE 5 embodiment. In this embodiment, coupler head 44a also supports an annular retaining collar 118a which has a configuration as shown in FIGURE 5 and is internally threaded at 124, with a turning handle 119a projecting therefrom.

Adapter unit $B_1$ of FIGURE 5 includes a main fitting 76, and a one-way tubular rubber valve within member 110, with a tap rod (such as 106) and other related parts not shown which are of the same construction as corresponding parts of the described embodiment of FIGURES 1–4A. However (instead of collar 118 of adapter A of FIGURES 1–4A), the adapter unit $B_1$ of FIGURE 5 includes an annular ring 126, which has a configuration as shown in FIGURES 5–5A, and is externally threaded at 128 for cooperation with the threaded portion 124 of the retaining collar 118 comprising part of dispenser coupler unit $A_1$. The lower part of ring 126 (shown inverted in FIGURE 5A) is provided with a pair of inwardly projecting lips 122a, for the same purpose of effecting a bayonet type mounting of adapter $B_1$ on laterally extending keg key flange 23 (in similar manner as mounting of adapter B per the embodiment of FIGURES 1–4A). Ring 126 also includes an upper annular flange 130 adapted to overlie flange 78 of the main fitting 76 of keg adapter $B_1$. Thus, as will be apparent from FIGURE 5 and the foregoing description, the keg adapter unit $B_1$ of FIGURES 5–5A comprises the main fitting 76 (including the valve 90, etc., therein), ring 126, and annular washer 116 which is retained below flange 78 of fitting 76 by means of lips 122a on ring 126.

In usage, this adapter unit $B_1$ is assembled on the laterally projecting flange 23a of the beer keg by means of the mentioned bayonet connection including lips 122a (in a manner similar to the installation of the adapter unit B of FIGURES 1–4A), whereby fitting 76 and the tap rod, etc., extend within the beer keg in like manner as discussed with reference to FIGURES 1–4A, as will be apparent to those skilled in the art in light of the disclosure herein. (If desired, ring 126 of the keg adapter unit $B_1$ can be provided with a pair of aligned recesses 129 on opposite sides of its central aperture, so that the ring 128 can be turned with a spanner wrench, particularly if the bayonet connection between the keg flange 23 and keg adapter unit $B_1$ includes means for providing a wedging effect, as discussed in connection with the embodiment of FIGURES 1–4A.) Dispenser coupler unit $A_1$ is assembled on keg adapter unit $B_1$ by screwing collar 118a onto collar 126, using handle 119a, until the portion of collar 118a bearing against shoulder 48a of head 44a causes the O-ring 56 to suitably seal against the top flange 78 of adapter unit $B_1$. It is noted that the siphon components are arranged so that turning of collar 118a will not cause a displacement of the keg adapter unit $B_1$ from the keg flange 23; for example, the thickness of compression washer 116 could be such that it takes a substantially higher torque to turn the adapter unit $B_1$ than the torque imposed on the coupler unit $A_1$ to assemble it on the adapter unit $B_1$ with sealing compression of O-ring 56.

When the coupler unit $A_1$ is assembled on the adapter unit $B_1$ as above-described, the probe end 65 of coupler head 44a depresses the stem of the valve within the main fitting 76 (not shown in FIGURE 5, but the same as discussed in connection with FIGURES 1–4A). Thereafter, the dispensing siphon comprising units $A_1$ and $B_1$ assembled as shown in FIGURE 5 is used in the same manner as the dispensing siphon embodiment of FIGURES 1–4A, in a manner which will be apparent to those skilled in the art in light of the disclosure herein.

As will be apparent, the keg adapter unit $B_1$ would normally be semi-permanently installed in the beer keg at the brewery, and the coupler unit $A_1$ would be a semi-permanent part of the dispensing equipment in a restaurant or the like and would be installed by the bar tender, as described in connection with FIGURES 1–4A.

It is noted that one of the principal advantages of the embodiment of FIGURES 5-5A is that it is particularly useful with one type of currently available conventional beer keg which has an annular sunken top section adjacent the top opening through which the beer is tapped. The adapter unit $B_1$ is so arranged that it does not project any substantial extent beyond the key flange 23, thus facilitating stacking of the kegs if desired. Keg adapter unit $B_1$ is preferably provided at the brewery with a suitable cap, e.g., a plastic cup-shaped threaded closure screwed onto threads 128 of ring 126.

Referring now to FIGURES 7 and 7A, there is shown therein still another siphon embodiment of the present invention, which is a modification of the above-described embodiments of FIGURES 1-4A and FIGURES 5-5A. For clarity, and to minimize duplication of description, parts of the embodiment of FIGURES 7-7A which are the same as those in the embodiments of FIGURES 1-4A or 5-5A are identified by like numerals as in FIGURES 1-4A or 5-5A; and modified parts of FIGURES 7 and 7A which correspond to parts of FIGURES 1-4A or 5-5A are identified by like numerals as in FIGURES 1-4A or 5-5A plus the subscript $b$, to the extent that is feasible.

In the embodiment of FIGURES 7-7A, the siphon assembly comprises a keg adapter unit $B_2$ and a dispenser coupler unit $A_2$, which are similar to the keg adapter and dispenser coupler units of FIGURES 1-4A and FIGURES 5-5A, but modified as now explained.

The head 44b of the dispenser coupler unit $A_2$ is the same as the head 44a of coupler unit $A_1$ of FIGURE 5, excepting that the head 44b is made in one piece with the probe end 65 extending therefrom, and a bore 66 extending therethrough, as will be apparent from FIGURE 7. (Thus, other parts of the probe 64 of the embodiments of FIGURES 1-4A and FIGURES 5-5A are omitted accordingly.) A conventional coupler 34a (of somewhat different design from the coupler 34 shown in the embodiments of FIGURES 1-4A and FIGURES 5-5A, but similar to the gas coupler 25 of those figures) is mounted in an enlarged threaded bore at the upper end of bore 66 in head 44b, for the siphoning of beer through head 44b, to a dispenser (such as 40 in FIGURE 1). The coupler unit $A_2$ also includes an annular internally threaded retainer ring 118a with a handle 119a (as in the above-described embodiment of FIGURE 5).

The keg adapter unit $B_2$ of this embodiment includes a main fitting 76 incorporating the spring-loaded valve 90, plus a tubular one-way rubber valve 108 enclosed in aperture cover member 110, with a beer tapping or restrictor rod 106, etc., having the same construction as corresponding parts identified by like numerals as in FIGURES 1-4A, excepting that the main fitting flange 78b is modified. In the embodiment of FIGURES 7-7A, the exterior periphery of flange 78 is threaded, as shown at 132 in FIGURE 7, for cooperation with the threads 130b of the inwardly extending flange of ring 126b (which is otherwise like ring 126 in the FIGURES 5-5A embodiment). An O-ring 116b of rubber or like material is secured, as by suitable adhesive, to the main fitting 76b beneath annular flange 78, as shown particularly in FIGURE 7 (and in dotted line of FIGURE 7A), to serve as a keg sealing ring as below explained. The upper surface of flange 78b is provided with a pair of aligned apertures 133 adapted to receive the prongs of a spanner wrench for installation of the main fitting 76b, as below described. Thus, as will be apparent from FIGURES 7-7A and the foregoing description, the adapter $B_2$ of this embodiment comprises the main fitting 76b with O-ring 116b thereon, plus externally threaded ring 126b, which also has lower projecting lips (similar to 122a in FIGURE 5A) to establish a bayonet connection with flange 23 of the beer keg.

In usage, the keg adapted unit $B_2$ of this embodiment is assembled on the flange 23 of the beer keg by first applying the ring 126b to keg flange 23, utilizing the aforementioned bayonet type connection. As will be apparent, at this point the ring 126b will fit somewhat loosely on the beer keg flange 23. The rest of the keg adapter unit $B_2$, comprising the main fitting 76b and tap rod 106 extending therefrom, etc., is then installed in the keg through opening 22; and the threaded exterior of flange 78 is screwed into the internally threaded flange of ring 126b, using a spanner wrench with prongs in apertures 133. The fitting 76b is turned until its top is substantially flush with the top of ring 126b; and the parts are so sized that the O-ring 116b will compress sufficiently against the top of the keg flange 23 to provide a good seal. Preferably O-ring 116b is compressed with sufficient force so that the fitting 76b and ring 126b are held against displacement from keg flange 23, with the inwardly extending lips of ring 126b firmly engaging the underside of keg flange 23, when the adapter unit $B_2$ is installed as described.

The dispenser coupler unit $A_2$ is then assembled on the keg adapter unit $B_2$ by screwing collar 118 onto the threaded exterior of adapter unit collar 126b, until the O-ring 56 is caused to compress in sealing engagement against the top of flange 78b. At the same time, probe end 65 of head 44b depresses the stem 98 of the valve 95, whereafter the dispensing siphon $A_2$-$B_2$ of FIGURES 7-7A is used in the same above-described manner as the siphon embodiment of FIGURES 1-4A, as will be apparent to those skilled in the art.

Also, as will be apparent, the adapter unit $B_2$ would usually be semi-permanently installed in the keg at the brewery, and the adapter unit $A_2$ is quickly installed at the dispensing establishment by the bar tender.

Referring now to FIGURES 6 and 6A, there is shown at 76c a modified type of main fitting, with a different one-way gas valve 108c, which can be used in the adapter units A, $A_1$ and $A_2$ of FIGURES 1-4A, 5-5A, and 7-7A, respectively, in lieu of the main fitting 76 or 76b disclosed and described in connection with the latter figures.

Fitting 76c comprises a main cylindrical section with a flange 78 extending laterally from the upper end thereof, and is provided with three axial bores 80, 82 and 84c of different sizes as shown in FIGURE 6. The lower and smaller bore 84c is threaded and receives the upper end of the restrictor or tap rod 106, similarly to bore 84 in the embodiments of FIGURES 1-4A and 7-7A. The upper part of bore 80 is threaded for at least part of its length and a rubber seating ring 88 is supported on the shoulder 81, at the lower end of this bore. Ring 88 is held in place by an annular retaining ring 92 threaded into the upper part of bore 80, ring 92 having spanner wrench indentations 94 for the purpose of tightening it against the sealing ring 88. There is disposed within the bore 82 a valve member 95 urged against the underside of ring 88 by a spring 97 in like manner as in the described embodiments of FIGURES 1-4A and 7-7A. (It will be noted, however, that fitting 76c does not include bore 86 and ferrule 100, 102, etc., as in the embodiments of FIGURES 1-4A and 7-7A.)

Fitting 76c is provided with a small vertical bore 87c, and a coaxial enlarged threaded bore 136 at the lower end thereof. Bore 136 receives the threaded end of a small cylindrical ferrule 138 which has an axial bore 139 in communication with bore 87c, and a peripheral lower lip 140. The previously mentioned one-way gas valve 108c is made of a short length of flattened rubber tubing, one end of which is secured in sealing engagement around the lip 140 on ferrule 138. The remainder of the flat rubber tube has its sides pressed together (as shown in section in FIGURE 6) to form a "flap valve."

The flange 78 of the fitting 76c would be provided with recesses such as shown at 79 in FIGURES 1-4A for use in lieu of fitting 76 in the keg adapter unit A or $A_1$ of the embodiments of FIGURES 1-4A and 5-5A. Analogously, the flange 78 of the fitting 76c will be provided with peripheral threads, like threads 132 on flange 78b, when fitting 76c is used in lieu of fitting 76b in the keg adapter unit of FIGURES 7–7A.

When the modified fitting 76c is used as part of the keg adapter unit, air or gas fed through the aperture 62 of the head of the coupler unit (A, A₁ or A₂) will pass through aperture 87c due to cooperating seals formed by O-rings such as shown at 56 and 75 in FIGURES 2 and 7. When the pressure of the gas fed into the aperture 87c exceeds the pressure within the beer keg, the flap valve 108 will distend slightly, so that the gas will pass into the keg and drive the beer up the tap rod 106. Since the probe of the assembled coupler unit (A, or A₁, or A₂) will have depressed the valve member 95 (in like manner as in the described embodiments of FIGURES 1–4A and 7–7A) beer forced up the tap rod 106 will pass through the aperture in seating ring 88 and thence through the coupler unit head to the dispenser, in like manner as described with reference to the embodiments of FIGURES 1–4A and 7–7A, as will be apparent to those skilled in the art in light of the disclosure herein. However, when the pressure in the beer keg is greater than the pressure of the gas fed to bore 87c, the sides of the flap valve 108c will be pressed together and this will prevent gas or beer in the keg from passing back up into the bore 87c and into related parts of the siphon assembly through which compressed air or gas is supplied to the beer keg.

Thus, although the construction including the tubular slit valve 108 of FIGURES 1–4A and 7–7A is preferable, for reasons set forth in my co-pending application Serial No. 25,592 filed April 29, 1960, now abandoned, it will be apparent that the new improved beer dispensing siphon device of this invention, comprising the new keg adapter unit and new dispensing coupler unit disclosed and described above, can be used with another type of one-way air valve; for example, the valve just described with reference to FIGURES 6 and 6A.

It will be apparent from the foregoing that the present invention provides a new improved gas pressure siphon device for drawing fluid such as beer from containers such as beer kegs, utilizing a new improved keg adapter which remains in the keg at all times keeping it sealed; and a new improved dispenser coupler which is semi-permanently connected to the dispenser and can be readily assembled to the keg and its adapter by a bar tender; and that this invention thus achieves the various important objects and advantages of the present invention set forth earlier in this application.

While I have thus described preferred embodiments of the present invention, many variations will be suggested to those skilled in the art. It must therefore be understood that the foregoing description is meant to be illustrative only and should not be considered limitative of my invention; and all such variations and modifications as are in accord with the principles described are meant to fall within the scope of the appended claims.

Having thus described my invention, I claim:

1. A siphon adapter for installation in a keg having top, bottom and side walls with an aperture in at least one keg wall, whereby the adapter seals said keg and provides means for removal of liquid therefrom, said keg adapter being characterized in that it comprises: a main fitting member; means for securing said fitting member within said keg aperture; means for providing a seal between said fitting member exterior and the keg in which the adapter is installed; a liquid passageway extending through said fitting member to permit passage of fluid from the interior of said keg to the exterior thereof; a normally closed liquid valve in said fitting member liquid passageway; a gas passageway extending through said fitting member from the outside of said keg to the inside thereof, bypassing said liquid passageway and said liquid valve to permit flow of gas toward the inside of said keg; siphon tube means connected with the interior end of the liquid passageway in said fitting member; said fitting member having an annular portion surrounding a part of said siphon tube, means forming a gas passage extension therebetween in communication with said gas passageway in the fitting member; a one-way gas check valve comprising a slit cylindrical valve of flexible material having spaced portions thereof sealingly engaged with said annular portion of said fitting members and said siphon tube means.

2. A siphon device including: an adapter for installation in a keg having top, bottom and side walls with an aperture in at least one keg wall, whereby the adapter seals said keg and provides means for removal of liquid therefrom, said keg adapter being characterized in that it comprises: a main fitting member; means for securing said fitting member within said keg aperture; means for providing a seal between said fitting member exterior and the keg in which the adapter is installed; a liquid passageway extending through said fitting member to permit passage of fluid from the interior of said keg to the exterior thereof; a normally closed liquid valve in said fitting member liquid passageway; a gas passageway extending through said fitting member from the outside of said keg to the inside thereof, bypassing said liquid passageway and said liquid valve to permit flow of gas toward the inside of said keg; siphon tube means connected with the interior end of the liquid passageway extending through said fitting member; said fitting member having an annular portion surrounding part of said siphon tube means forming a gas passage extension therebetween in communication with said gas passageway in the fitting member; a one-way gas check valve comprising a slit cylindrical valve of flexible material having spaced portions thereof sealingly engaged with said siphon tube means and said portion of the said fitting member surrounding said siphon tube means; a liquid dispensing coupler comprising: a head member having means for opening said normally closed liquid valve in the keg adapter when said dispensing coupler is assembled with said keg adapter; fluid passage means in said coupler head communicating with the outlet of said liquid valve in said keg adapter to permit flow of liquid from said keg through said head; gas passage means in said head; sealing means between said keg adapter and said dispensing coupler whereby said gas passage in said head is in communication with said gas passage in said keg adapter, bypassing said fluid passage through said keg adapter and said dispensing coupler; and means for connecting said keg adapter with said liquid dispensing coupler.

3. A keg and siphon apparatus as defined in claim 2, wherein: said means for connecting said keg adapter to said dispensing coupler comprises a collar rotatably mounted on said coupler head, said collar including fastening means; and said keg adapter having fastening means for securing said head collar to said keg adapter.

4. A siphon device for installation in a keg having top, bottom and side walls with an aperture in at least one keg wall, including an adapter which seals said keg and provides means for removal of liquid therefrom, said keg adapter being characterized in that it comprises: a main fitting member; means for securing said fitting member within said keg aperture; means for providing a seal between said fitting member exterior and the keg in which the adapter is installed; a liquid passageway extending through said fitting member to permit passage of fluid from the interior of said keg to the exterior thereof; a normally closed liquid valve in said fitting member liquid passageway; said normally closed liquid valve in said adapter fitting member including an apertured seating member, and a movable valve closure member adapted to seal with said apertured seating member and having a portion extending through the aperture in said seating member and projecting toward the fitting member portion disposed to the outside of a keg, whereby depressing of said projecting portion will open said normally closed valve, and spring means normally urging said closure member against said seating ring to normally close said valve; a gas passageway extending through said fitting member from the outside of said keg to the inside thereof, bypassing said liquid passageway and said liquid valve to permit flow of gas toward the inside of said keg; siphon tube means connected with the interior end of the liquid passageway extending through said fitting member; said fitting member having an annular portion surrounding a part of said siphon tube forming a gas passage extension therebetween in communication with said gas passageway in the fitting member; a one-way gas check valve comprising a slit annular valve of flexible material having spaced portions thereof sealingly engaged with said annular portion of said fitting member and said siphon tube means; a coupler comprising: a head member with a probe extending therefrom into a portion of said liquid passage in said keg adapter and depressing said valve closure projection to open said normally closed liquid valve, and means for connecting said coupler to said adapter to provide a siphon arrangement for a keg; a passageway through said probe and head for the passage through said coupler of fluid from the liquid passageway in said adapter; sealing means between said probe and a portion of said keg adapter, and additional sealing means between said head and another portion of said keg adapter, said gas passages in said keg adapter and said head member having end portions disposed between said sealing means so that gas from the gas passage in said head member will pass through the gas passage in said adapter to said annular slit gas valve, with the gas and liquid passages of the siphon assembly being isolated from each other.

5. A siphon device for installation in a keg having top, bottom and side walls with an aperture in at least one keg wall, including an adapter which seals said keg and provides means for removal of liquid therefrom, said keg adapter being characterized in that it comprises: a main fitting member; means for securing said fitting member within said keg aperture; means for providing a seal between said fitting member exterior and the keg in which the adapter is installed; a liquid passageway extending through said fitting member to permit passage of fluid from the interior of said keg to the exterior thereof; a normally closed liquid valve in said fitting member liquid passageway; said normally closed liquid valve in said adapter fitting member including an apertured seating member, and a movable valve closure member adapted to seal with said apertured seating member and having a portion extending through the aperture in said seating member and projecting toward the fitting portion disposed to the outside of a keg, whereby depressing of said projecting portion will open said normally closed valve, and spring means normally urging said closure member against said seating ring to normally close said valve; a gas passageway extending through said fitting member from the outside of said keg to the inside thereof, bypassing said liquid passageway and said liquid valve to permit flow of gas toward the inside of said keg; siphon tube means connected with the interior end of the liquid passageway extending through said fitting member; said fitting member having an annular portion surrounding a part of said siphon tube means forming a gas passage extension therebetween in communication with said gas passageway in the fitting member; a one-way gas check valve comprising a slit annular valve of flexible material having opposite ends thereof sealingly engaged with said annular portion of said fitting member and said siphon tube means; said keg adapter including a laterally extending flange with means for securing said adapter within a keg aperture comprising: annular collar means having inwardly extending projections for establishing a connection with a flanged neck surrounding the keg aperture, with a sealing ring disposed between said adapter flange and the keg neck flange, thus retaining said main fitting member in the keg opening, said collar means having an exterior threaded portion adapted to receive an internally threaded part of a coupler used with said keg adapter to provide a complete siphon apparatus.

6. A liquid dispensing apparatus adapted for use in a keg or like container for liquids which has top, bottom and side walls with an opening in one wall of said keg, characterized in that it comprises a keg adapter including: a main body adapted to be secured within the keg wall opening and having a liquid passage extending through the body to permit transfer of liquids from the inside to the outside of a keg; a normally closed liquid valve in said liquid passage, including a seat having an opening therethrough, and a valve member having a stem extending through said opening in said seat, part of said stem being removed thus providing an increased flow path clearance between said seat opening and the stem portion extending therethrough, with means normally biasing part of said valve member into sealing engagement with said seat; at least one passage in said main body for transmission of gas from the outside to the inside of said keg, bypassing said liquid valve; siphon tube means associated with said liquid passage; and slit annular gas valve means having a portion thereof sealingly associated with a part of said main body adapted to be disposed within a keg and having another portion thereof sealingly associated with said siphon tube means, said valve means having a slit annular intermediate portion extending around said siphon tube means permitting flow of gas toward the inside of the keg and preventing flow of liquid from the keg into said gas passage.

7. A tapping device or siphon for a keg or like container for liquids such as beer which has top, bottom, and side walls with an opening in one wall of said keg, characterized in that it comprises: a keg adapter including a main body adapted to be secured within a keg opening, with a liquid passage extending through said main body to permit transfer of liquid from the inside to the outside of a keg; a normally closed liquid valve in said liquid passage, including a seat having an opening therethrough, and a valve member having a stem extending through said opening in said seat, part of said stem being cut away so as to increase the flow path between said stem and said opening, with means normally biasing part of said valve member into sealing engagement with said seat; at least one gas passage in said main body for transmission of gas from the outside to the inside of a keg, bypassing said liquid valve; gas valve means associated with part of said gas passage in a portion of said main body disposed within a keg for permitting flow of gas toward the inside of the keg and preventing flow of liquid from the keg into said gas passage; means for securing said main adapter body in said opening of a keg with a seal therebetween; a coupler and dispensing unit including a head member having a probe extending therefrom, with a liquid passage extending through said probe and coupler head; a gas passage in said coupler head bypassing said liquid passage in the coupler head; means for securing said coupler and dispensing unit to said adapter with said probe extending into a portion of said liquid passage in said keg adapter and depressing said stem of the liquid valve member, thus opening said normally closed liquid valve and permitting liquid to pass from the keg side of the liquid passage in the adapter through said liquid valve and said liquid passage in said probe and coupler head; sealing means between a portion of said probe and a portion of said keg adapter, and additional sealing means between said coupler head and another portion of said keg adapter, the adjacent ends of said gas passage in said keg adapter and said coupler head member being disposed between said sealing means, so that gas will pass from the gas passage in the head member through the gas passage in said keg adapter to said gas valve means of the adapter, with the gas and liquid passage of the tapping device assembly being isolated from each other.

8. A liquid storing and dispensing apparatus for beer or the like, comprising: a keg having top, bottom and side walls with an opening in at least one wall; a keg adapter; means for sealingly securing said adapter in said keg opening; said keg adapter having a main body with a liquid passage extending through said body from the outside to the inside of said keg; a normally closed liquid valve in said liquid passage, including a seat having an opening therethrough, and a valve member having a plate portion with a stem extending from said plate portion through said opening in said seat, said stem being cut away so as to increase the flow path between said stem and said opening, with means normally biasing said plate portion of the valve member into sealing engagement with said seat; at least one passage means in said main body of the adapter bypassing said liquid valve for transmission of gas from the outside to the inside of said keg; siphon tube means associated with said liquid passage of the adapter and extending from said adapter to adjacent the bottom of said keg; and annular gas valve means of resilient material disposed within the keg having a portion thereof extending around said siphon tube means, said resilient valve means including at least one slit portion permitting flow of gas toward the inside of the keg and preventing flow of liquid from the keg into said gas passage.

9. The apparatus as defined in claim 8 and further including a liquid dispensing coupler connected to said keg adapter, said liquid dispensing coupler comprising: a head member having means for opening said normally closed liquid valve in said keg adapter when said dispensing coupler is assembled with said keg adapter, liquid passage means in said coupler head communicating with the outlet of said liquid passage means in said adapter to permit the flow of liquid from said keg through said coupler head; gas passage means in said head and sealing means between said keg adapter and said dispensing coupler whereby one end of said gas passage means in said coupler head is in communication with the gas passage means in said adapter, bypassing said liquid passage means in said keg adapter and said dispensing coupler.

10. A liquid dispensing apparatus adapted for use with a keg or like container for liquids which has top, bottom and side walls, with an opening in one wall of said keg characterized in that it comprises: a keg adapter including a main body and an outwardly extending flange portion ,said adapter being adapted to be secured within the keg wall opening; a liquid passage extending through said main body for transfer of liquid from the inside to the outside of said keg; a normally closed liquid valve in said liquid passage; at least one gas passage in said adapter bypassing said liquid passage and liquid valve, for transmission of gas from the outside to the inside of a keg; siphon tube means connected with said liquid passage on one side of said liquid valve; gas valve means associated with said gas passage including an annular portion of resilient material surrounding part of said main body adapted to be disposed within a keg opening with another portion thereof extending around said siphon tube means, said annular resilient gas valve portion having at least one slit therein permitting flow of gas toward the inside of said keg and preventing flow of liquid from the keg into said gas passage.

11. A liquid dispensing apparatus for a conventional beer keg having top, bottom and side walls with an unthreaded opening in at least one wall surrounded by a conventional unthreaded keg neck and a flange extending laterally therefrom, comprising: a keg adapter having a main body with an outwardly extending flange; a liquid passage in said main body for transfer of liquid from the inside to the outside of said keg; a normally closed liquid valve in said liquid passage; siphon tube means in communication with one side of said liquid valve normally disposed within the keg; at least one gas passage in said adapter bypassing said liquid passage and liquid valve, for transmission of gas from the outside to the inside of said keg; gas valve means associated with a portion of said gas passage normally disposed within the keg for permitting the flow of gas toward the inside of the keg and preventing the flow of liquid from the keg into the gas passage; collar means for securing said keg adapter within the unthreaded keg opening, said collar means including a first inwardly extending flange portion for overlying said adapter flange and said keg flange and inwardly extending projections for extending below said keg flange to clamp said adapter flange between said collar flange portion and said keg flange, with a sealing ring disposed between said keg flange and adapter flange.

12. A liquid dispensing apparatus for a conventional beer keg having top, bottom and side walls with an unthreaded opening in at least one wall surrounded by a conventional unthreaded keg neck and a flange extending laterally therefrom, comprising: a keg adapter having a main body with an outwardly extending flange; a liquid passage in said main body for transfer of liquid from the inside to the outside of said keg; a normally closed liquid valve in said liquid passage; siphon tube means in communication with one side of said liquid valve normally disposed within the keg; at least one gas passage in said adapter bypassing said liquid passage and liquid valve, for transmission of gas from the outside to the inside of said keg; gas valve means associated with a portion of said gas passage normally disposed within the keg for permitting the flow of gas toward the inside of the keg and preventing the flow of liquid from the keg into the gas passage; collar means for securing said keg adapter within the unthreaded keg opening, said collar means including a first inwardly extending flange portion for overlying said adapter flange and said keg flange and inwardly extending projections for extending below said keg flange to clamp said adapter flange between said collar flange portion and said keg flange, with a sealing ring disposed between said keg flange and adapter flange; a coupler and dispensing unit including a head member having a probe extending therefrom, with a liquid passage extending through said probe and coupler head; a gas passage in said coupler head bypassing said liquid passage in the coupler head; means for securing said coupler and dispensing unit to said collar means securing said adapter in the keg neck, with said probe extending into a portion of said liquid passage in said keg adapter and thus opening said a normally closed liquid valve, permitting liquid to pass from the keg side of the liquid passage in the adapter through said liquid valve and said liquid passage in said probe and coupler head; sealing means between a portion of said probe and a portion of said keg adapter, and additional sealing means between said coupler head and the flange portion of said keg adapter, the adjacent ends of said gas passage in said keg adapter and said coupler head member being disposed between said sealing means so that gas will pass from the gas passage in the head member through the gas passage in said keg adapter to said gas valve means of the adapter, with the gas and liquid passage of the tapping device assembly being isolated from each other.

13. A tapping device as defined in claim 7 wherein said sealing means includes an O-ring sealing member carried by said probe adjacent the end thereof which depresses the stem of the liquid valve member and wherein said additional sealing means includes an annular sealing member.

14. A tapping device as defined in claim 7 wherein said liquid passage in said keg adapter is formed coaxial with the central longitudinal axis of said main body of said keg adapter and wherein said gas passage in said keg adapter is completely separate from and eccentrically positioned with respect to said central liquid passage in said keg adapter main body.

15. A tapping device as defined in claim 7 wherein said main body of said keg adapter includes annular collar means surrounding and engaging a portion of said main body of the keg adapter outside of said keg and also engaging a portion of the exterior of said keg; and said collar means having threaded means on its outer periphery adapted for cooperation with said means for securing said coupler and dispensing unit to said keg adapter, said coupler securing means also being threaded.

References Cited by the Examiner

UNITED STATES PATENTS 3,065,885 11/1962 Chatten _____ 222—400.7

References Cited by the Applicant

UNITED STATES PATENTS 584,836 6/1897 Farnoff et al.
614,465 11/1898 Habermann.
911,225 2/1909 Falch.
1,995,098 3/1935 Healey.
2,083,281 6/1937 Spayd.
2,223,012 11/1940 Wanderski et al.
2,279,927 4/1942 Noth.
2,539,349 6/1951 Giles.
2,638,914 5/1953 Falith et al.
2,746,796 5/1956 St. Germain.

LOUIS J. DEMBO, *Primary Examiner.*

HADD S. LANE, *Examiner.*

UNITED STATES PATENT OFFICE
CERTIFICATE OF CORRECTION

Patent No. 3,231,154                      January 25, 1966

Mack S. Johnston

It is hereby certified that error appears in the above numbered patent requiring correction and that the said Letters Patent should read as corrected below.

Column 1, line 18, for "contantly" read -- constantly --; line 43, for "As" read -- A --; column 3, line 1, strike out "is", second occurrence; line 18, for "taped" read -- tapped --; column 4, line 15, for "he" read -- the --; line 23, for "is" read -- of --; column 5, line 5, for "the" read -- and --; column 7, line 70, for "sterilizer" read -- sterilized --; column 8, line 13, after "coupler" insert -- head --; column 9, lines 23 and 24, for "compresed" read -- compressed --; column 10, line 18, and column 11, line 6, for "key", each occurrence, read -- keg --; column 11, line 54, for "78" read -- 78b --; column 18, line 45, strike out "a".

(SEAL)          Signed and sealed this 10th day of January 1967.

Attest:

ERNEST W. SWIDER                       EDWARD J. BRENNER
Attesting Officer                             Commissioner of Patents